United States Patent
Lal et al.

(10) Patent No.: US 9,296,614 B1
(45) Date of Patent: Mar. 29, 2016

(54) SUBSTRATE SUCH AS FOR USE WITH CARBON NANOTUBES

(71) Applicant: Corning Incorporated, Corning, NY (US)

(72) Inventors: Archit Lal, Ithaca, NY (US); Windsor Pipes Thomas, III, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/593,192

(22) Filed: Jan. 9, 2015

Related U.S. Application Data

(60) Provisional application No. 62/078,616, filed on Nov. 12, 2014.

(51) Int. Cl.
| | |
|---|---|
| *C01B 31/02* | (2006.01) |
| *B01J 35/10* | (2006.01) |
| *B01J 35/00* | (2006.01) |
| *B01J 21/08* | (2006.01) |
| *B01J 35/02* | (2006.01) |

(52) U.S. Cl.
CPC ............ *C01B 31/0233* (2013.01); *B01J 21/08* (2013.01); *B01J 35/002* (2013.01); *B01J 35/023* (2013.01); *B01J 35/10* (2013.01); *B01J 35/1004* (2013.01)

(58) Field of Classification Search
CPC ...... Y10T 428/30; C23C 16/00; C23C 16/26; C01B 1/0233
USPC .......................................... 428/408; 423/448
See application file for complete search history.

(56) References Cited

U.S. PATENT DOCUMENTS

| | | | |
|---|---|---|---|
| 7,662,732 B2 | 2/2010 | Choi et al. | 438/800 |
| 7,677,058 B2 | 3/2010 | Hawtof et al. | 65/17.4 |
| 8,021,747 B2 | 9/2011 | Yi et al. | 428/304.4 |
| 8,062,733 B2 | 11/2011 | Hawtof et al. | 428/167 |
| 8,138,568 B2 | 3/2012 | Yoon et al. | 257/461 |
| 8,181,485 B2 | 5/2012 | Coffey et al. | 65/90 |
| 8,359,884 B2 | 1/2013 | Hawtof | 65/17.4 |
| 8,366,853 B2 | 2/2013 | Liu et al. | 156/161 |
| 8,431,066 B2 | 4/2013 | Liu | 264/482 |
| 8,438,876 B2 | 5/2013 | Noni, Jr. | 65/413 |
| 8,623,258 B2 | 1/2014 | Liu | 264/316 |

(Continued)

FOREIGN PATENT DOCUMENTS

| | | |
|---|---|---|
| CN | 103964413 | 8/2014 |
| WO | 2014/139147 | 9/2014 |
| WO | 2014/180242 | 11/2014 |

OTHER PUBLICATIONS

"Fused Quartz Properties & Usage Guide" by Momentive Quartz, dated May 18, 2007, retrived Jun. 5, 2015.*

(Continued)

*Primary Examiner* — Aaron Austin
*Assistant Examiner* — Laura Figg
(74) *Attorney, Agent, or Firm* — Russell S. Magaziner

(57) ABSTRACT

An assembly, such as for growing carbon nanotubes, includes a substrate including $SiO_2$ and has a thickness of less than 500 μm. Further, the substrate is bendable and has a surface with non-flat or non-polished texture such that surface comprises raised and recessed features for receiving a coating, such as a catalyst. Carbon nanotubes may be anchored to and grow from the recessed features of the substrate.

30 Claims, 8 Drawing Sheets

(56) References Cited

U.S. PATENT DOCUMENTS

| | | | |
|---|---|---|---|
| 8,746,013 B2 | 6/2014 | Geremew et al. ............... | 65/531 |
| 2004/0192151 A1 | 9/2004 | Tsukamoto et al. | |
| 2006/0043861 A1 | 3/2006 | Liu ............................... | 313/311 |
| 2007/0237705 A1* | 10/2007 | Itoh et al. .................... | 423/447.1 |
| 2008/0075949 A1 | 3/2008 | Kirst et al. | |
| 2008/0093698 A1* | 4/2008 | Tsakalakos et al. .......... | 257/499 |
| 2008/0199389 A1* | 8/2008 | Chiu et al. .................. | 423/447.3 |
| 2011/0230373 A1 | 9/2011 | Liu ............................... | 506/22 |
| 2011/0233816 A1* | 9/2011 | Liu ............................... | 264/164 |
| 2013/0001444 A1 | 1/2013 | Zhou et al. | |
| 2013/0052413 A1 | 2/2013 | Hawtof ......................... | 428/141 |
| 2013/0316136 A1 | 11/2013 | Hawtof et al. ................ | 428/141 |
| 2014/0291287 A1 | 10/2014 | Stockum et al. ............... | 216/42 |

OTHER PUBLICATIONS

U.S. Appl. No. 62/025,627, filed Jul. 17, 2014, Hawtof.

Schnitzler et al.; "Incorporation, Oxidation and Pyrolysis of Ferrocene into Porous Silica Glass: a Route to Different Silica/Carbon and Silica/Iron Oxide Nanocomposites"; Inorganic Chemistry, (2006) vol. 45, No. 26; pp. 10642-10650.

Ward et al.; "Substrate effects on the growth of carbon nanotubes by thermal decomposition of methane"; Chemical Physics Letters 376 (2003); pp. 717-725.

Saha et al.; "Films of Bare Single-Walled Carbon Nanotubes from Superacids with Tailored Electronic and Photoluminescence Properties"; American Chemical Society (2012) vol. 6, No. 6; pp. 5727-5734.

Huang et al.; "Patterned Growth and Contact Transfer of Well-Aligned Carbon Nanotube Films"; J. Phys. Chem. B (1999), 103; pp. 4223-4227.

Murakami et al.; "Direct synthesis of high-quality single-walled carbon nanotubes on silicon and quartz substrates"; Chemical Physics Letters 377 (2003); pp. 49-54.

Murakami et al.; "Growth of vertically aligned single-walled carbon nanotube films on quartz substrates and their optical anisotropy"; Chemical Physics Letters 385 (2004); pp. 298-303.

Valley Design Corp.: "Fused quartz and fused silica substrates", Oct. 16,2014, XP055242863, Retrieved from the Internet: URL:https://web.archive.org/web/20141016204330/http://ultra-thin.com/fused-quartz.htm [retrieved on Jan. 19, 2016].

European Patent Office; Invitation to Pay Additional Fees (PCT/ISA/206); Mail Date: Jan. 27, 2016; pp. 1-7.

* cited by examiner

SUBSTRATE SUCH AS FOR USE WITH CARBON NANOTUBES

PRIORITY

This Application claims priority to U.S. Application No. 62/078,616, filed Nov. 12, 2014, which is incorporated herein by reference in its entirety.

BACKGROUND

1. Field

The present disclosure relates generally to high temperature substrate materials, which may be used for making and/or depositing carbon nanotubes.

2. Technical Background

Carbon nanotubes are typically grown on substrate materials able to survive extreme conditions of manufacturing processes for carbon nanotubes, such as the substrate not softening at temperatures exceeding 800° C. and the substrate withstanding contact with potent chemicals, such as nitric acid used to etch or remove the carbon nanotubes. Accordingly, heat insensitive materials, such as gallium nitride, sapphire, silicon wafers, silica wafers hewn from bulk silica blocks, etc. are often used for the substrate materials. However, many conventional substrates for carbon nanotube growth and/or deposition tend to be inflexible, inefficiently shaped, thick and heavy, and extremely costly due to correspondingly extensive processes for manufacturing such substrates.

For example, typical silicon wafers 110, which may be used as substrates for carbon nanotube 112 growth, are grown as part of large crystal rods/ingots that are subsequently cut into disc-shaped wafers that are then finished with grinding, lapping, and polishing. These manufacturing steps result in circular wafers 110 with smooth finished surfaces 114, as shown in FIG. 1. However, the wafers 110 tend to be relatively thick and/or inflexible, because the cutting, grinding, lapping, and polishing manufacturing steps may be difficult with particularly thin flexible sheets. Further, inflexibility of conventional substrates may pose a problem for removal of carbon nanotubes 112 by making it difficult to scrape off and/or collect the carbon nanotubes 112. Further, a thermally grown oxide layer may be used to grow carbon nanotubes.

Further, Applicants have observed that wafer substrates 110 are circular, which may be inefficient for manufacturing carbon nanotubes, in terms of utilizing the available space, especially when the carbon nanotubes are manufactured in rectilinear spaces. However, due to the conventional crystal rod/ingot manufacturing approach, circular shapes tend to provide the maximum surface per slice of the rod, and cutting the circular shapes to rectilinear shapes may be counterintuitive to substrate manufacturers due to the high expense of the manufacturing process and the desire of substrate manufacturers to maximize the surface area of the corresponding substrates, regardless of the shape of the equipment for manufacturing carbon nanotubes.

A need exists for substrates, such as those for use with making or using carbon nanotubes (e.g., growing, depositing, supporting, etc.), where the substrates overcome some or all of the above problems generally associated with conventional such substrates.

BRIEF SUMMARY

Embodiments include an assembly for making and/or using carbon nanotubes includes a substrate and at least one of carbon nanotubes and precursors thereof. The substrate is $SiO_2$ (silica) or a doped version thereof and has a thickness of less than 500 μm. Further, the substrate is bendable and has a surface with non-flat or non-polished texture such that surface comprises raised and recessed features. Carbon nanotubes and/or precursors thereof are coupled to recessed features of the substrate.

Some embodiments include a fused quartz substrate for making and/or using carbon-nanotubes. The fused quartz substrate is arranged as a particularly thin sheet having a thickness of less than 500 μm, such as less than 250 μm, and in some such embodiments less than 150 μm. The fused quartz substrate has a minimum dimension orthogonal to thickness that is less than 100 m and greater than 100 μm, such as less than 10 m and greater than 1 mm, such as less than 5 m and greater than 3 mm. The fused quartz substrate has a non-circular periphery defining a surface interior thereto that is orthogonal to the thickness, where the surface is primarily unpolished such that the surface has a surface roughness Ra of greater than 1.5 angstrom for a 40 by 30 micrometer area thereon, which may be a subsection of the surface. The fused quartz substrate is bendable such that the thin sheet bends to a radius of curvature of at least 500 mm without fracture at 25° C., such as at least 300 mm, such as at least 150 mm, thereby facilitating bending of the substrate such as for removal of carbon-nanotubes.

Some embodiments include an assembly for making and/or using carbon nanotubes, where the assembly includes a substrate and at least one of carbon nanotubes and precursors thereof. The substrate consists of at least 99% by weight of a glass of the composition of $(SiO_2)_{1-x-y}M'_xM''_y$, where either or both of M' and M'' is an element, dopant, or substitution, which may be in an oxide form, or combination thereof, or is omitted, and where the sum of x plus y is less than 1, such as less than 0.5, and/or where x and y are 0.1 or less, such as 0.05 or less, such as 0.025 or less, and in some such embodiments greater than $10 \times 10^{-7}$ for either or both of M' and M''. The substrate is arranged as a particularly thin sheet having a thickness of less than 500 μm, such as less than 250 μm, and in some such embodiments less than 150 μm. In certain embodiments, the substrate is crystalline and in certain cases the substrate is amorphous. The substrate has a minimum dimension orthogonal to the thickness (e.g., width, length) that is less than 100 m and greater than 100 μm, such as less than 10 m and greater than 1 mm, such as less than 5 m and greater than 3 mm. The substrate is bendable such that the thin sheet bends to a radius of curvature of at least 500 mm without fracture when at room temperature of 25° C., such as at least 300 mm, such as at least 150 mm. The substrate has a surface with non-flat or non-polished texture such that surface comprises raised and recessed features, wherein at least some of the raised features extend from the surface a distance of at least 10 angstroms further than the recessed features, such as at least 50 angstroms, such as at least 100 angstroms, such as at least 500 angstroms. Referring now to the at least one of carbon nanotubes and precursors thereof, the at least one of carbon nanotubes and precursors thereof are positioned indirectly on the substrate by way of at least one intermediate layer or coating, such as a catalyst or initiator; or are positioned directly on and contacting the substrate. In some such embodiments, at least some of the at least one of carbon nanotubes and precursors thereof are anchored to (e.g., adhered to, bonded to, having an end thereof attached to) at least some of the recessed features of the substrate. In other contemplated embodiments, substrates disclosed herein may be polished to decrease the presence of surface features as disclosed herein.

Some embodiments include an assembly for making and/or using carbon nanotubes, where the assembly includes a substrate and a catalyst integrated therewith and/or coupled thereto. The substrate has a composition, geometry, flexibility, and surface microstructure as described in the preceding paragraph. In some such embodiments, the substrate has a high softening point temperature, that being greater than 800° C. and has a low coefficient of thermal expansion, that being less than $10 \times 10^{-7}$/° C. in the temperature range of 50 to 300° C., which may also be the case for the other embodiments described herein. The catalyst is at least partially positioned in at least some of the recessed features of the substrate. Further, in some such embodiments, the catalyst comprises a transition metal, such as a transition metal oxide.

Some embodiments include a fused quartz substrate. The substrate has a periphery defining a surface interior thereto, where the surface is orthogonal to a thickness of the fused quartz substrate. The fused quartz substrate is arranged as a sheet with the thickness of less than 500 μm, such as less than 250 μm, and in some such embodiments less than 150 μm. The fused quartz substrate has a minimum dimension orthogonal to the thickness (e.g., width, length) that is less than 100 m and greater than 100 μm, such as less than 10 m and greater than 1 mm, such as less than 5 m and greater than 3 mm. The surface has an area greater than 1 $mm^2$, such as greater than 1 $cm^2$, such as greater than 4 $cm^2$, and/or less than 1 $km^2$, such as less than 30 $m^2$, which may apply to the other embodiments disclosed herein as well. In some such embodiments, the surface includes intersecting elongate features, the elongate features having a length at least ten times a width thereof. The features may be raised features and/or recessed features, where at least some of the elongate features have a width that is greater than 2 μm and less than 10 mm. Further, the surface has a textured microstructure that is at least in part formed by the intersecting elongate features, wherein raised features of the surface extend outward from the surface a distance of at least 2 μm greater than recessed features of the surface. Other such embodiments may include an unpolished surface with textured microstructure, but without elongate features and/or without intersecting elongate features.

Other embodiments include a process for densifying or at least partially sintering a soot sheet. The process includes a step of directing laser energy to a first portion of a soot sheet. The process includes another step of at least partially sintering the first portion of the soot sheet with the laser energy to increase the density of the first portion relative that to a second portion of the soot sheet that has not received the laser energy.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Various embodiments of the disclosure will be described in detail with reference to drawings, if any. Reference to various embodiments does not limit the scope of the inventive technology, which is limited only by the scope of the claims attached hereto. Additionally, any examples set forth in this specification are not limiting and merely set forth some of the many possible embodiments of the claimed inventive technology.

Figure 2:
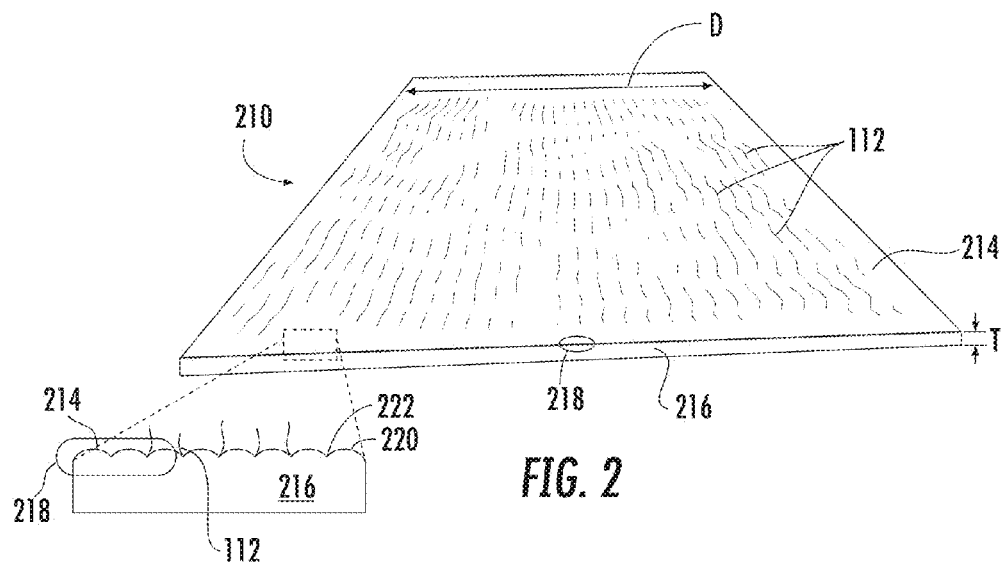
FIG. 2 is a schematic representation from a perspective view of a substrate according to an exemplary embodiment.

Referring to FIG. 2, an assembly 210 for making and/or using carbon nanotubes, where the assembly includes a substrate 216 and at least one of carbon nanotubes 112 and precursors thereof. The term "substrate" generally refers to a substance or layer that may underly something, or on which some process may occur. For example, the substrate may be a top layer of a multilayered structure, an exterior layer, an internal layer, etc. In some embodiments, the substrate 216 consists of at least 99% by weight of a glass of the composition of $(SiO_2)_{1-x-y} \cdot M'_x M''_y$, where either or both of M' and M'' is an element (e.g., a metal) dopant, or substitution, which may be in an oxide form, or combination thereof, or is omitted, and where the sum of x plus y is less than 1, such as less than 0.5, or where x and y are 0.4 or less, such as 0.1 or less, such as 0.05 or less, such as 0.025 or less, and in some such embodiments greater than $1E^{-6}$ for either or both of M' and M''. In some embodiments, the substrate is highly pure quartz, such as at least 99.5% quartz, such as 99.9% quartz. Put another way, in some embodiments, the substrate is highly pure $SiO_2$, such as at least 99.5% $SiO_2$, such as 99.9% $SiO_2$.

According to an exemplary embodiment, the substrate 216 is arranged as a particularly thin sheet. Such a thin sheet may be counter-intuitive for substrate manufacturers due to the processes of cutting, grinding, lapping, and polishing, which may require or benefit from a greater thickness. In some embodiments, the sheet has a thickness T of less than 500 μm, such as less than 250 μm, and in some such embodiments less than 150 μm, where thickness T refers to at least one portion of the sheet. According to an exemplary embodiment the thickness is between 50 μm and 1 mm. Such thickness T values may alternatively be average thickness values for sheets according to embodiments disclosed herein.

According to an exemplary embodiment, the substrate 216 has a minimum dimension D orthogonal to the thickness (e.g., width, length, minimum surface dimension) that is less than 100 m and greater than 100 μm, such as less than 10 m and greater than 1 mm, such as less than 5 m and greater than 3 mm. Such dimensions may be useful for manufacture of carbon nanotubes, such as for use with equipment used on an assembly line.

According to an exemplary embodiment, the substrate 216 is bendable such that the thin sheet bends to a radius of curvature of at least 500 mm without fracture when at room temperature of 25° C., such as at least 300 mm, such as at least 150 mm. Bending of the substrate may aid in removal and/or control of carbon nanotubes, such as by raising a subsection of the surface and facilitating scrapping off of the carbon nanotubes. Bending may also help with roll-to-roll applications, such as processing across rollers in automated manufacturing equipment, such as carbon nanotube manufacturing line.

According to an exemplary embodiment, the substrate 216 has a surface 214 with non-flat or non-polished texture 218 such that the surface 214 includes raised and recessed features 220, 222, where at least some of the raised features 220 extend from the surface a distance of at least 10 angstroms further than the recessed features 222, such as at least 50 angstroms, such as at least 100 angstroms, such as at least 500 angstroms.

Figure 3:
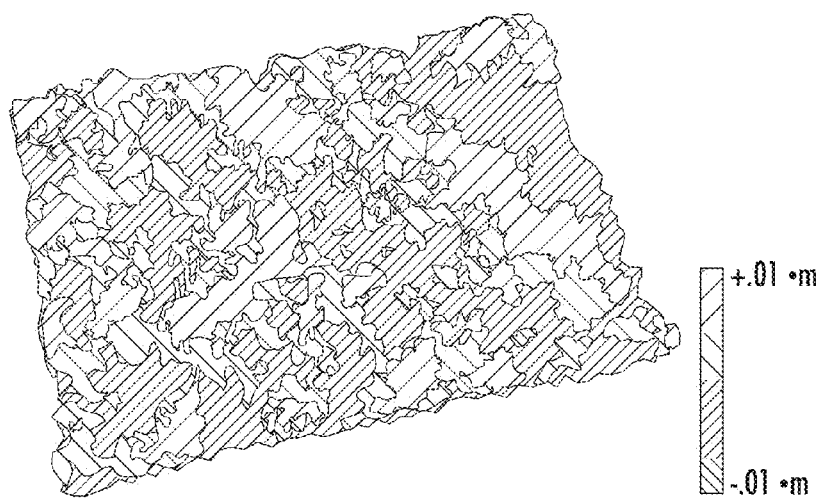
FIG. 3 is a 3D nano-scale representation of a measured profile of a surface of substrate according to an exemplary embodiment.
Figure 4:
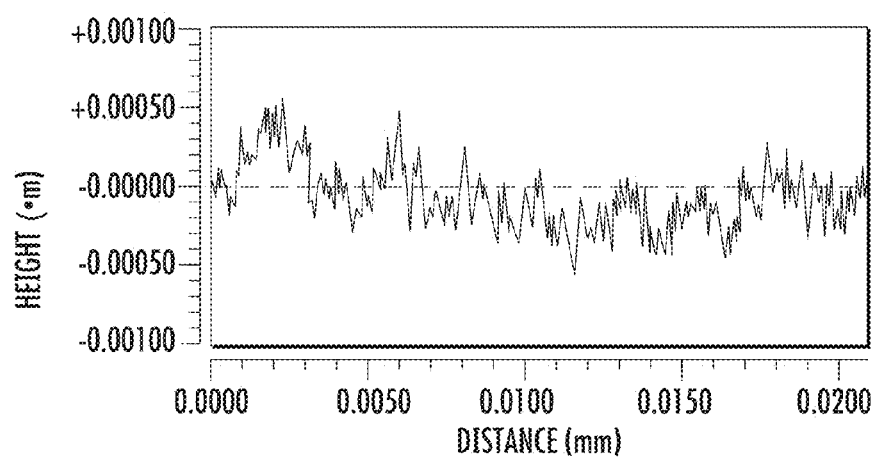
FIG. 4 is a 2D nano-scale representation of a measured profile of the surface of FIG. 3.

For example, FIG. 3 shows a 3D representation of a 40 by 30 micrometer area of the surface 214 of a substrate 210 according to an exemplary embodiment. FIG. 4 shows a 2D representation of nanostructure of the same substrate sample as FIG. 3. Both FIGS. 3-4 show the raised and recessed portions 220, 222 of the surface 214 on a nano-scale, where the surface 214 is non-flat or unpolished, especially when compared to typical polished silicon wafer substrates for carbon nanotube growth.

Figure 5:
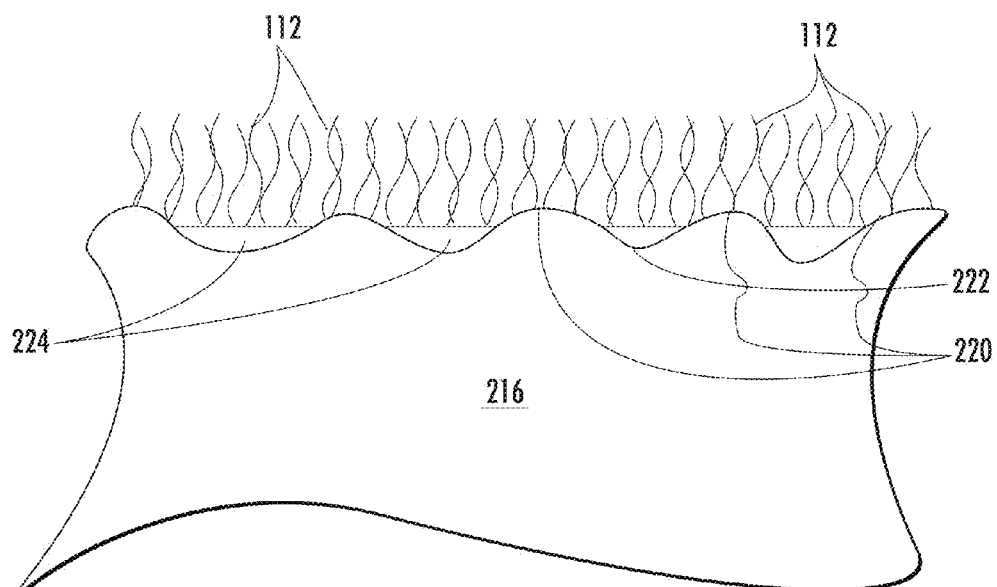
FIGS. 5-8 are schematic representations from side sectional views of portions of assemblies for carbon nanotubes according to exemplary embodiments.
Figure 6:
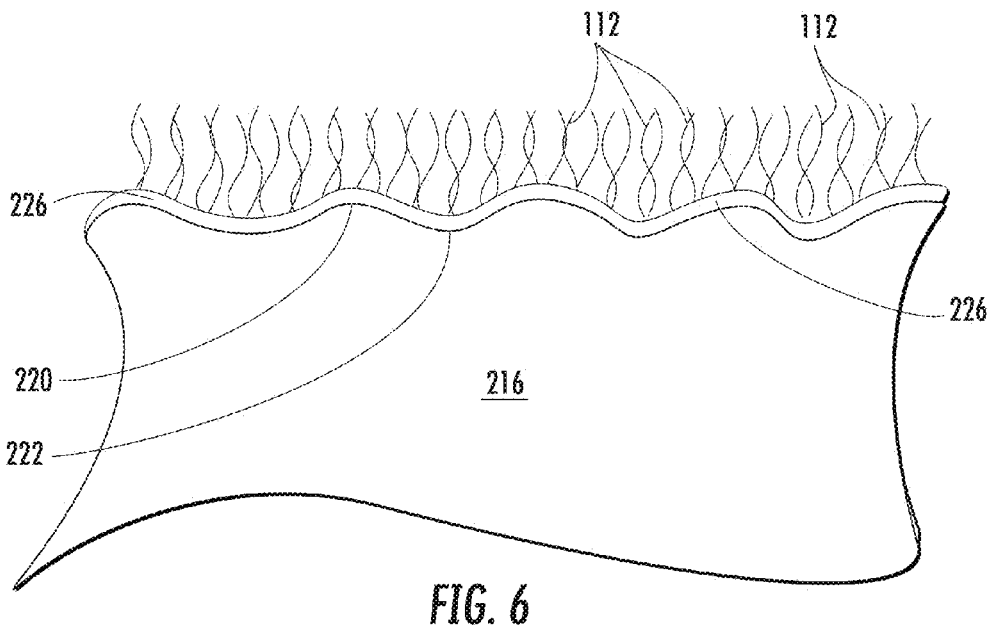
Figure 7:
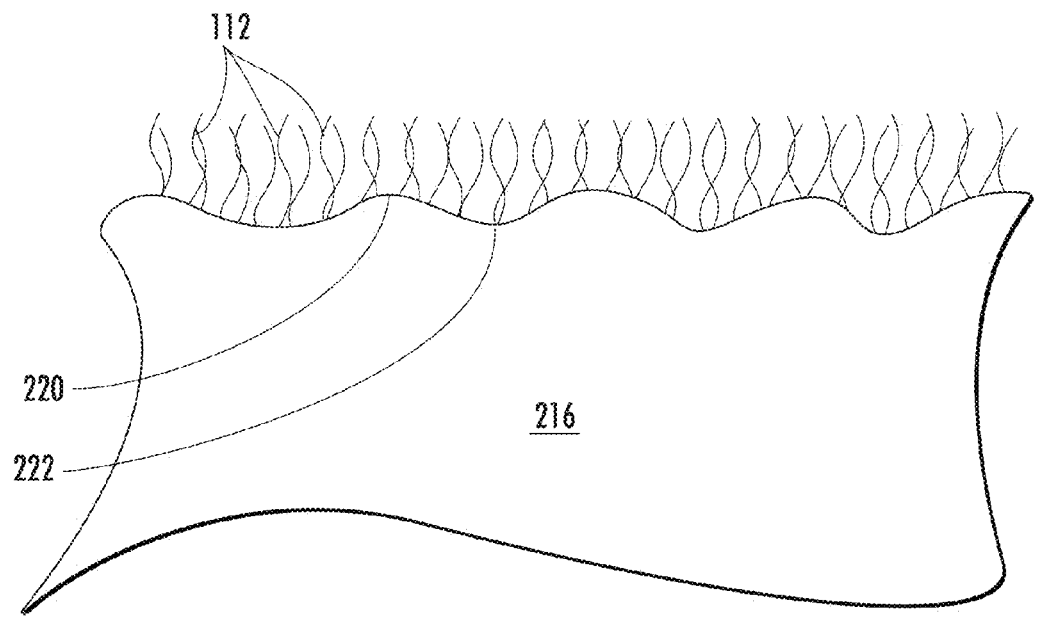

Referring now to FIGS. 5-8, in some embodiments of the assembly 210, the carbon nanotubes 112 and/or precursors thereof are positioned indirectly on the substrate 216, such as by way of at least one intermediate layer or coating 224 (FIG. 5), 226 (FIG. 6). In some embodiments, the intermediate layer or coating 224 is or includes a catalyst or initiator, such as a transition metal to initiate carbon nanotube growth. The intermediate layer or coating 224 may be deposited by techniques such as chemical vapor deposition, evaporation, and sputtering. In other embodiments, the carbon nanotubes 112 and/or precursors thereof are positioned directly on and contacting the substrate 216, as shown in FIG. 7 and in some portions of the assembly shown in FIG. 5.

Figure 8:
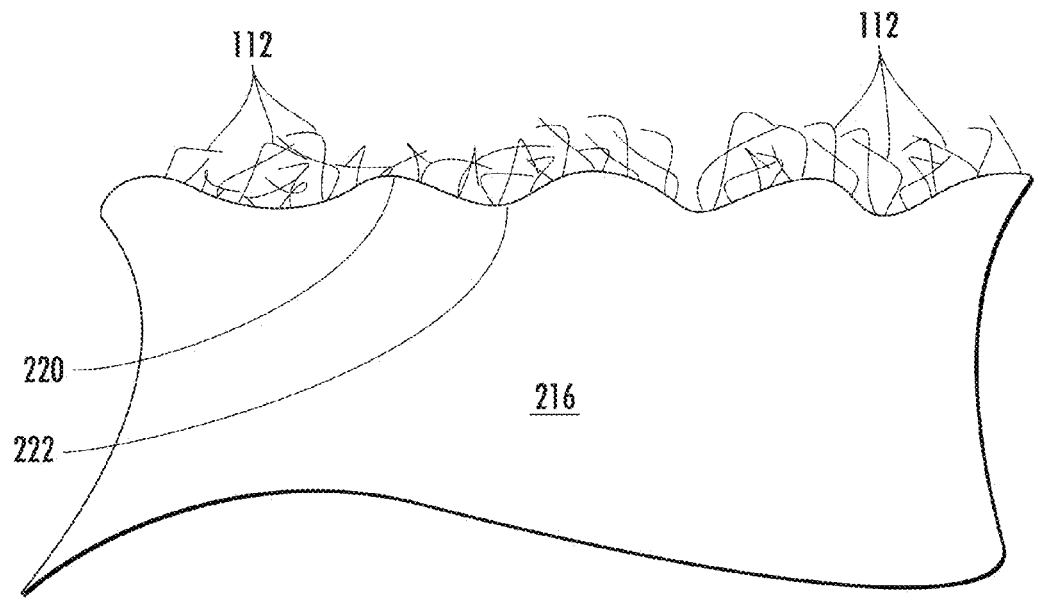

As shown in FIGS. 5-7, in some embodiments, at least some of carbon nanotubes 112 and/or precursors thereof are anchored to (e.g., adhered to, bonded to, having an end thereof attached to) the substrate 216. In some such embodiments, carbon nanotubes 112 and/or precursors thereof are anchored to at least some of the recessed features of the substrate, where the carbon nanotubes 112 are elongate tubes. In some embodiments, most of the carbon nanotubes 112 on the substrate 216 are coupled to the substrate 216 in the recessed features 222, such as at least 60%, at least 70% of the carbon nanotubes on the substrate overlaying the recessed features 222. The recessed features 222 may collect the intermediate layer or coating 224, such as a liquid that includes catalyst. In other embodiments, as shown in FIG. 8, the carbon nanotubes 112 may be deposited on the substrate 216, but not anchored thereto.

In some such embodiments, the substrate 216 has a high softening point temperature, that being greater than 800° C., such as greater than 900° C., such as greater than 1000° C., and/or has a low coefficient of thermal expansion, that being less than $10 \times 10^{-7}$/° C. in the temperature range of 50 to 300° C. The high softening point of the substrate 216 allows the substrate 216 to withstand high processing temperatures, such as temperatures of between 800-900° C. for growing carbon nanotubes. The low coefficient of thermal expansion of the substrate 216 provides structural stability to the assembly 210 with changes in temperature, as may occur during manufacturing of carbon nanotubes.

Figure 1:
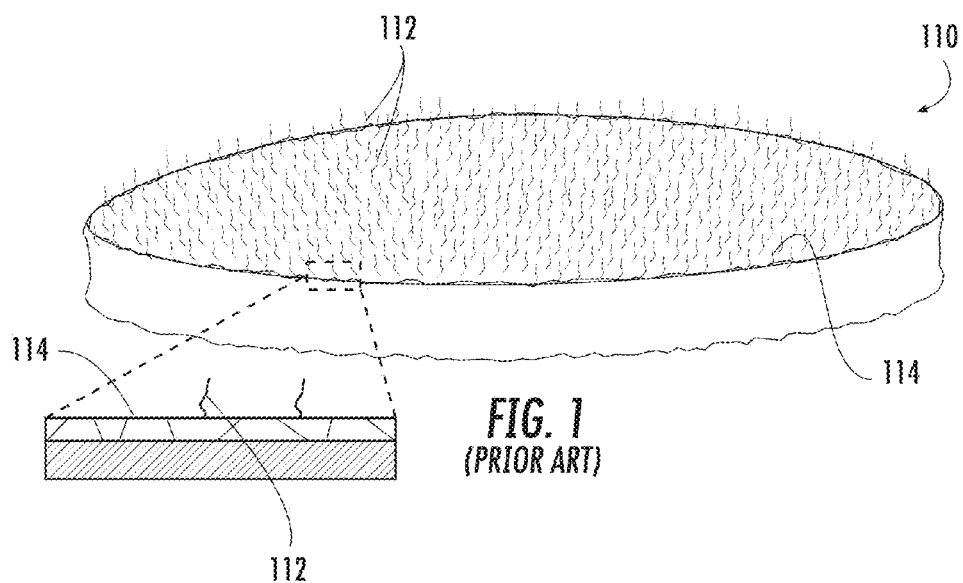
FIG. 1 is schematic representation from a perspective view of a conventional silicon wafer used as a substrate for growing carbon nanotubes.

According to an exemplary embodiment, the substrate 216 has a non-circular and/or non-round periphery orthogonal to the thickness thereof (compare FIG. 2 to FIG. 1). Put another way, the shape of the top and/or bottom surface 214 of the substrate 216 is non-circular and/or non-round, such as rectilinear, polygonal, rectangular. With such a shape, the substrate 216 may more efficiently fill space in equipment for carbon nanotube growth when compared to circular wafers. Shaping substrates 216 to be non-circular and/or non-round may be counterintuitive to substrate manufacturers because it may require removal of portions of the substrate to achieve the non-circular and/or non-round shape if the substrate (e.g., silicon wafer 110) is manufactured according to crystal rod approach.

Figure 9:
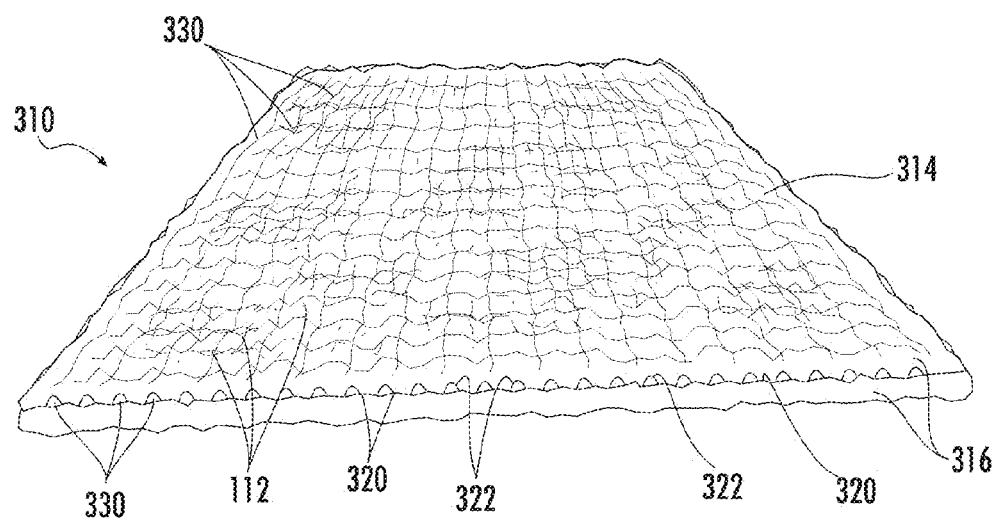
FIG. 9 is a schematic representation from a perspective view of a substrate according to another exemplary embodiment.
Figure 10:
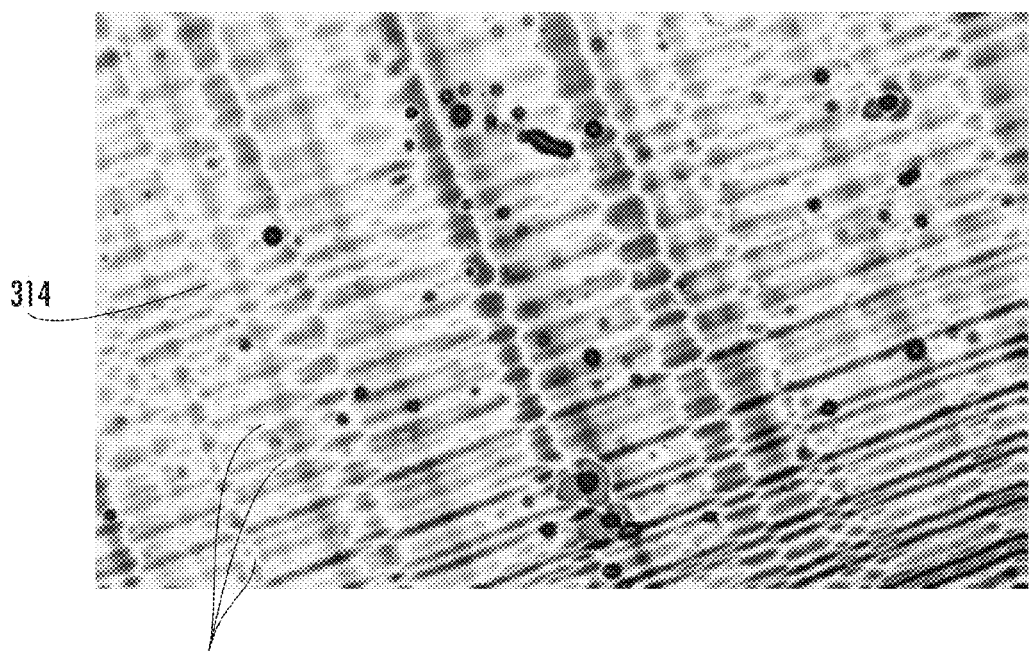
FIG. 10 is a 3D micro-scale representation of a measured profile of a surface of substrate according to an exemplary embodiment.

Referring to FIGS. 9-10, an assembly 310 includes a substrate 316 having a surface 314, where the surface includes intersecting elongate features 330 (e.g., grooves, ridges, channels, canals). In some embodiments, some or all of the elongate features 330 have a length that is at least ten times a width thereof. The elongate features 330 may be crisscrossing linear elongate features, such as crisscrossing horizontal and vertical linear elongate features that form a rectilinear grid as shown in FIGS. 9-10; or the elongate features 330 may be otherwise shaped and/or otherwise angled relative to one another. Control of the shape and orientation of the elongate features may be achieved by laser sinter, as described herein. The intersecting elongate features 330 may form initiation sites for carbon nanotube growth, which may achieve higher concentrations of carbon nanotube growth.

According to an exemplary embodiment, at least some of the elongate features 330 have a width that is greater than 2 μm and less than 10 mm, such as greater than 10 μm and less than 5 mm, such as greater than 50 μm and less than 2 mm. For such embodiments, texture of the surface 314 is at least in part formed by the intersecting elongate features 330, such as in addition to unpolished nanostructure as shown in FIGS. 3-4. In some embodiments, raised features 322 of the surface 314 extend outward from the surface 314 a distance of at least 2 μm greater than recessed features 322 of the surface 314, such as at least 5 μm greater, such as at least 10 μm greater.

Figure 11:
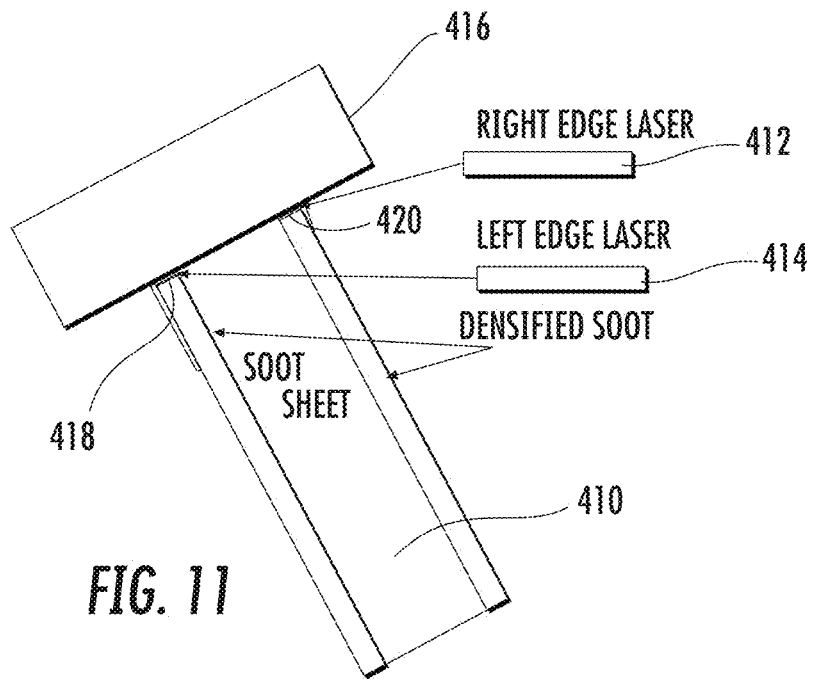
FIGS. 11-12 are schematic representations from a perspective view of substrates manufactured according to exemplary embodiments.
Figure 12:
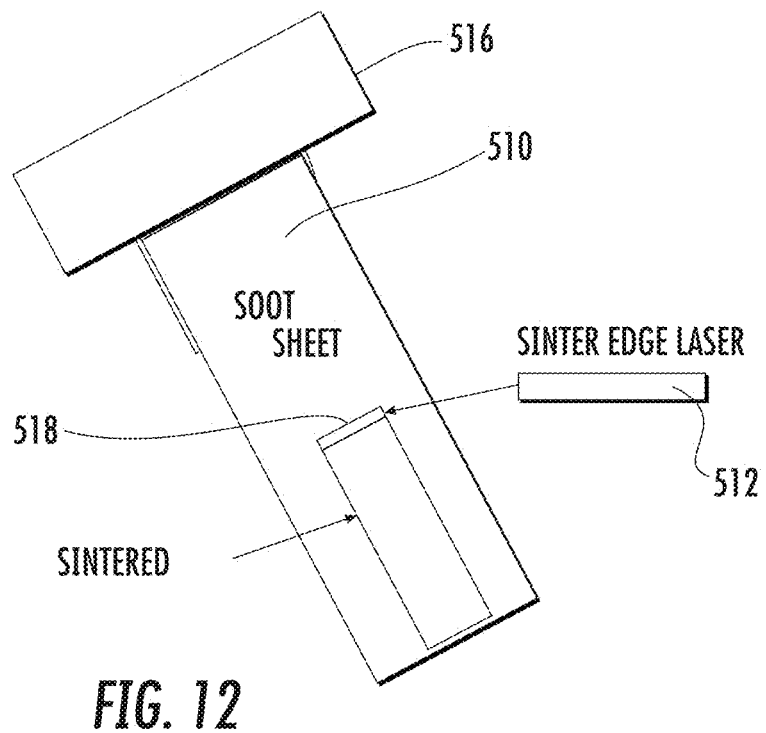

Referring now to FIGS. 11-12, soot sheets 410, 510 (e.g., sheet of $SiO_2$ soot, quartz soot, a soot form of a glass or precursor thereof, such as any glass material described herein), which may be sintered and used as substrates as described herein, may be in various forms. For example, the soot may be pressed into a sheet having a low density, such as less than 1.5 g/cm³, such as less than 1 g/cm³, such as less than 0.5 g/cm³. FIGS. 11-12 show lasers 412, 414, 512 (e.g., $CO_2$ lasers, greater than 100 Watt laser, greater than 200 W laser, less than 2000 W laser) at least partially sintering and/or densifying the respective soot sheets 410, 510, which are extending from manufacturing equipment 416, 516 such as a soot deposition rotor, tread, wheel, roller, or other such equipment.

While other sintering device may be used to achieve some embodiments, Applicants have discovered advantages with laser sintering in the particular ways disclosed herein. For example, Applicants found that laser sintering may not radiate heat that damages surrounding equipment or overheat and burn up the susceptor (e.g., platinum susceptor, graphite) which may be concerns with sintering via induction heating and resistance heating. Applicants found that laser sintering has good control of temperature and repeatability of temperature and may not bow or otherwise warp the ribbon, which may be concerns with flame sintering. In comparison to such other processes, laser sintering may provide the required heat directly and only to the portion of the soot sheet needing to be sintered. Laser sintering may not send contaminates and gas velocity to the sintering zone, which may upset manufacturing of the thin sheets. Further, laser sintering is also scalable in size or for speed increases.

According to an exemplary embodiment, a laser(s) 412, 414, 512 may be directed by lenses (e.g., on ends thereof, spaced apart therefrom) to form a laser energy plane 418 (e.g., beam of rectangular cross-section), 420, 518 to sinter the soot sheet to glass, such as to produce a ribbon of high viscosity glass. Some embodiments of the process include fully sintering the soot sheet from low density soot sheet (e.g., 0.5 g/cm$^3$) to fully sintered, such as having a density greater than 1.0 g/cm$^3$, such as greater than 1.5 g/cm$^3$, such as greater than 2.0 g/cm$^3$ (e.g., 2.2 g/cm$^3$) or more, such as by any of the above processes, and preferably by the laser(s) 412, 414, 512.

Figure 15:
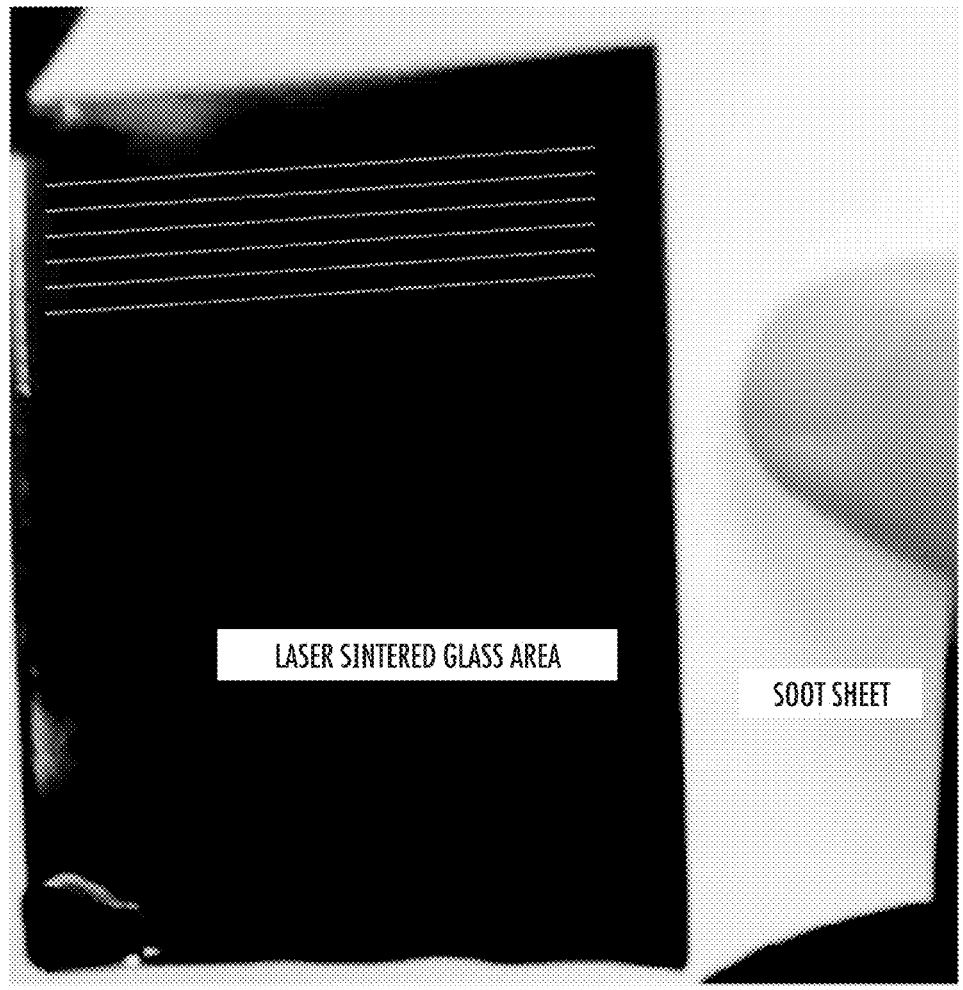
FIG. 15 is a digital image of a partially sintered soot sheet having a portion thereof that is fully sintered and another portion thereof that is not.

Other embodiments include partially sintering the soot sheet 410 such that the soot sheet has a density greater than 0.5 g/cm$^3$ and/or less than 2.2 g/cm$^3$. Partially sintered soot sheets may hold together better than unsintered sheets, such as being able to be rolled on a spool (e.g., spool diameter of at least 1 in and/or no more than 12 in). In contemplated embodiment, unsintered soot sheets or partially sintered soot sheets, of materials as described herein, may be used as end products, such as serving as substrates, layers, barriers, etc., such as to aid with carbon nanotubes or for other purposes. Likewise, glass substrates described herein may be used for purposes other than making or using carbon nanotubes. FIG. 15 shows a partially sintered soot sheet, where a rectangle of fully sintered soot (glass) adjoins un-sintered soot.

Figure 13:
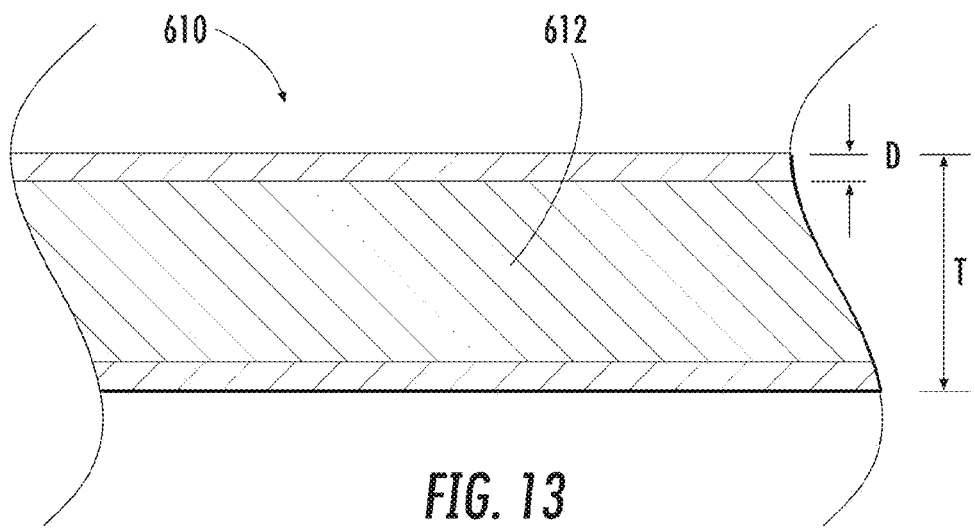
FIGS. 13-14 are schematic representations from side sectional views of portions of substrates according to exemplary embodiments
Figure 14:
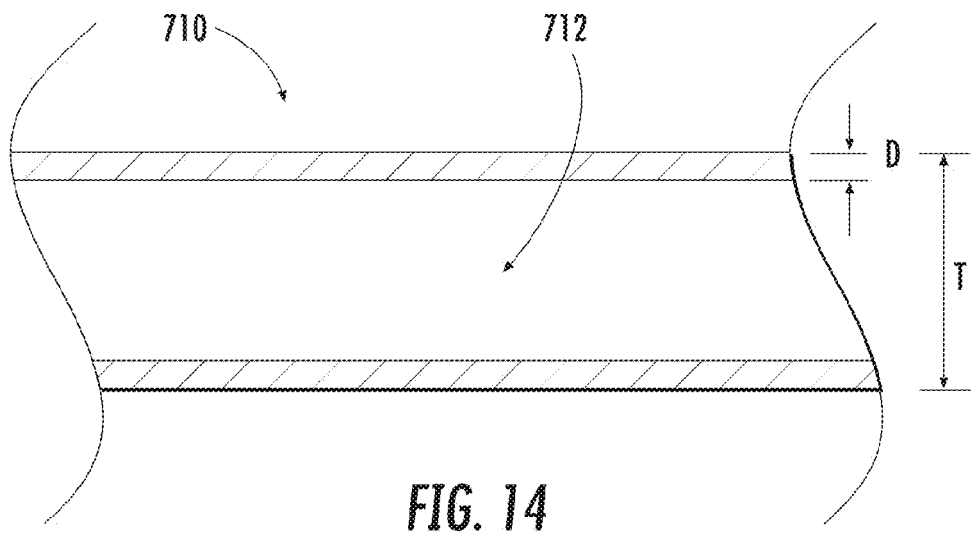

Referring to FIGS. 13-14, sheets 610, 710 have been at least partially sintered to a depth D, such as by laser sintering. In some such embodiments, the process includes at least partially sintering (e.g., fully sintering) some or all of the soot sheet 610, 710 to some depth of the soot sheet 610, 710 (see, e.g., depth D of FIGS. 13-14). The process may further include removing some or all un-sintered soot beneath the depth (compare FIG. 13 with internal soot layer 612 to FIG. 14 with internal void 712). At least partially sintering the soot sheet 610, 710 to form a skin 616, 618 may serve to hold the soot sheet together. Further, carbon nanotubes may be grown or deposited on the skin 616, 618.

According to an exemplary embodiment, the depth D is a positive quantity that is less than the thickness T of the sheet 610, 710, such as less than half of the T, such as less than a third of T, such as less than a quarter of T from an exterior surface of the substrate 610, 710 inward. Such controlled sintering may be achieve by adjusting the timing and power output of the laser 412, 414, 512, for example. In contemplated embodiments, only one of the exterior surfaces (e.g., top or bottom) of the substrate 610, 710 is at least partially sintered. In contemplated embodiments, the exterior surfaces on opposing sides of the sheet may be sintered and/or densified to different depth thicknesses T from one another.

Referring once more to FIGS. 11-12, in some embodiments the process at least partially (e.g., fully) sinters columns or other shapes of glass or densified soot through the soot sheet in selected patterns. Alternatively masking may be used to isolate portions of the soot sheet, which may then be removed or otherwise sintered to create geometry, such as a patterned profile for carbon nanotube growth. Some such selective and/or partial sintering may not be possible or may be extremely difficult with processes other than laser sintering. In some embodiments, use of a laser to sinter the edges of the soot sheet fully or partially, just prior to removing the soot sheet from the manufacturing line (e.g., following deposition rotor) overcomes processing issues where edges or ends of the soot sheet may tear or crack. This full or partial sintering of the edges prior to sheet removal from the manufacturing line may strengthen the edge and inhibit tearing or cracking.

Example 1

A 400 micron thick soot sheet was prepared, composed of greater than 99.9% $SiO_2$ by weight. A section of sheet that was 9 inches wide by 12 inches long was laid on a translating table in proximity to a laser. The laser was a 400 W $CO_2$ laser. An asymmetric aspherical lens was positioned between the laser and the soot sheet. The asymmetric aspherical lens generated a line beam of 10 mm long and approximately 1 mm wide with uniform intensity distribution across both long and short axis. The lens was placed roughly 380 mm away from the soot sheet. A laser power of 18 W of power was used. The soot sheet moved at 1.25 mm/sec across the beam. Clear, sintered glass, fully densified, was created in the path of the beam. Of surprise was the lack of distortion to the sheet as the soot was densified and to contract away from the remaining soot sheet. In other heating systems, the soot sheet may bend and deform unless held flat in a plane during the sinter process.

Example 2

Same condition as Example 1 but the soot sheet was translated at 1.5 mm/sec. This produced a partially densified layer of glass atop of unsintered soot sheet.

Example 3

Same as Example 1 but the greater than 99.9% $SiO_2$ soot sheet was solution doped to provide a small doping of Yb in the $SiO_2$ matrix, when sintered with the laser.

At least some fully sintered shoot sheets formed by laser sintering have transmittance of ultraviolet, visible, and/or near infrared light that is greater than 90%, such as greater than 92%, such as greater than 93% for a substrate thickness T (FIG. 1) of 0.1 mm.

In some embodiments, the soot sheet is dry and does not include liquid binder, but is instead bound by compression and/or intermeshing particles, or partially sintered in deposited particles, such as from flame hydrolysis.

In contemplated embodiments, the substrates disclosed herein may be used for manufacture and/or deposition of carbon structures other than carbon nanotubes, such as sp2, sp3, DLC (diamond like carbon), graphene. In some embodiments, substrates disclosed herein may be substantially non-flat, having a ratio of greater than 1 for the surface area divided by area of same geometry flat geometrical shape (e.g., surface area circular substrate embodiment as disclosed herein versus circle area; rectangular substrate embodiment versus surface area of rectangle of the same length and width), such as greater than 1.001, such as greater than 1.01, such as greater than 1.1. In some embodiments, the substrate is hydrophilic and/or olio phobic, whereby the substrate can be cleaned easily.

As used herein, the singular forms "a," "an" and "the" include plural referents unless the context clearly dictates otherwise. Thus, for example, reference to an "oxygen-containing functional group" includes examples having two or more such "functional groups" unless the context clearly indicates otherwise.

While various features, elements or steps of particular embodiments may be disclosed using the transitional phrase "comprising," it is to be understood that alternative embodiments, including those that may be described using the transitional phrases "consisting" or "consisting essentially of," are implied.

It will be apparent to those skilled in the art that various modifications and variations can be made to the present inventive technology without departing from the spirit and scope of the inventive technology. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

The disclosure has been described with reference to various specific embodiments and techniques. However, it should be understood that many variations and modifications are possible while remaining within the scope of the disclosure.

What is claimed is:

1. An assembly for growing carbon nanotubes, comprising:
    (A) a substrate,
        (i) wherein the substrate is formed from a glass of $(SiO_2)_{1-x-y} \cdot M'_x M''_y$ composition, where either or both of M' and M'' is an element, dopant, or substitution, which may be in an oxide form, or combination thereof, or is omitted, and where the sum of x plus y is less than 1;
        (ii) wherein the glass has a high softening point temperature, that being greater than 800° C.;
        (iii) wherein the substrate is arranged as a thin sheet having a thickness of less than 500 μm;
        (iv) wherein the substrate has a minimum dimension orthogonal to the thickness that is less than 100 m and greater than 1 mm;
        (v) wherein the substrate may bend to a radius of curvature of at least 500 mm without fracture when at room temperature of 25° C.; and
        (vi) wherein the substrate has a surface that comprises raised and recessed features, wherein at least some of the raised features extend from the surface a distance of at least 10 angstroms further than the recessed features, wherein the raised and recessed features are formed in the $SiO_2$ material of the substrate; and
    (B) a catalyst,
        (i) wherein the catalyst is at least partially positioned in the recessed features of the surface of the substrate; and
        (ii) wherein the substrate is chemically inert with respect to the catalyst; and
    (C) carbon nanotubes,
        (i) wherein the carbon nanotubes contact the catalyst; and
        (ii) wherein the carbon nanotubes are anchored to the recessed features of the substrate.

2. The assembly of claim 1, wherein the catalyst comprises a transition metal.

3. The assembly of claim 1, wherein the substrate has a non-circular periphery orthogonal to the thickness thereof, whereby the substrate may more efficiently fill non-circular space in equipment for carbon nanotube growth.

4. The assembly of claim 3, wherein the non-circular periphery is rectilinear.

5. The assembly of claim 1, wherein the surface comprises intersecting elongate features, the elongate features having a length at least ten times a width thereof, wherein at least some of the elongate features have a width that is greater than 2 μm and less than 10 mm; and wherein texture of the surface is at least in part formed by the intersecting elongate features, wherein at least some of the raised features of the surface extend outward from the surface a distance of at least 2 μm greater than at least some of the recessed features of the surface.

6. The assembly of claim 1, wherein the glass of the substrate has a high softening point temperature, that being greater than 1000° C.

7. The assembly of claim 6, wherein the glass has a particularly low coefficient of thermal expansion, that being less than $10 \times 10^{-7}/°$ C. in the temperature range of about 50 to 300° C., thereby facilitating dimensional stability to the substrate during processing of carbon nanotubes.

8. The assembly of claim 1, wherein the glass of the substrate consists of at least 99.5% $SiO_2$ by weight.

9. The assembly of claim 1, wherein the substrate has a thickness of less than 250 μm.

10. An assembly for growing carbon nanotubes, comprising:
    (A) a substrate,
        (i) wherein the substrate comprises $SiO_2$;
        (ii) wherein the substrate is arranged as a thin sheet having a thickness of less than 500 μm;
        (iii) wherein the substrate has a minimum dimension orthogonal to the thickness that is less than 100 m and greater than 1 mm;
        (iv) wherein the substrate may bend to a radius of curvature of at least 500 mm without fracture when at room temperature of 25° C.;
        (v) wherein the surface comprises intersecting elongate features, the elongate features having a length at least ten times a width thereof, wherein at least some of the elongate features have a width that is greater than 2 μm and less than 10 mm; and
        (vi) wherein texture of the surface comprises raised and recessed features at least in part formed by the intersecting elongate features, wherein at least some of the raised features of the surface extend outward from the surface a distance of at least 2 μm greater than at least some of the recessed features of the surface, wherein the raised and recessed features are formed in the $SiO_2$ material of the substrate; and
    (B) a catalyst at least partially positioned in the recessed features of the surface of the substrate; and
    (C) carbon nanotubes in contact with the catalyst, wherein the carbon nanotubes are anchored to the recessed features of the substrate.

11. The assembly of claim 10, wherein the catalyst comprises a transition metal.

12. The assembly of claim 10, wherein the substrate has a non-circular periphery orthogonal to the thickness thereof, whereby the substrate may more efficiently fill non-circular space in equipment for carbon nanotube growth.

13. The assembly of claim 12, wherein the non-circular periphery is rectilinear.

14. The assembly of claim 10, wherein the substrate has a high softening point temperature, that being greater than 800° C., whereby the substrate facilitates the carbon-nanotube growth at processing temperatures thereof.

15. The assembly of claim 14, wherein the substrate has a particularly low coefficient of thermal expansion, that being less than $10 \times 10^{-7}/°$ C. in the temperature range of about 50 to 300° C., thereby facilitating dimensional stability to the substrate during processing of carbon nanotubes.

16. The assembly of claim 10, wherein the substrate consists of a glass at least 99.5% $SiO_2$ by weight.

17. The assembly of claim 10, wherein the substrate has a thickness of less than 250 µm.

18. An assembly for growing carbon nanotubes, comprising:
(A) a substrate,
 (i) wherein the substrate is formed from a glass comprising $SiO_2$;
 (ii) wherein the glass has a high softening point temperature, that being greater than 800° C.;
 (iii) wherein the substrate is arranged as a thin sheet having a thickness of less than 500 µm;
 (iv) wherein the substrate has a minimum dimension orthogonal to the thickness that is less than 100 m and greater than 1 mm;
 (v) wherein the substrate may bend to a radius of curvature of at least 500 mm without fracture when at room temperature of 25° C.; and
 (vi) wherein the substrate has a surface that comprises raised and recessed features, wherein at least some of the raised features extend from the surface a distance of at least 10 angstroms further than the recessed features, wherein the raised and recessed features are formed in the $SiO_2$ material of the substrate; and
(B) a catalyst,
 (i) wherein the catalyst is at least partially positioned in the recessed features of the surface of the substrate; and
 (ii) wherein the substrate is chemically inert with respect to the catalyst; and
 (iii) wherein the catalyst comprises a transition metal.

19. The assembly of claim 18, wherein the glass of the substrate has a high softening point temperature, that being greater than 1000° C., and wherein the glass has a particularly low coefficient of thermal expansion, that being less than $10 \times 10^{-7}/°$ C. in the temperature range of about 50 to 300° C.

20. The assembly of claim 19, wherein the glass of the substrate has a density greater than 1.0 $g/cm^3$.

21. The assembly of claim 20, wherein the glass of the substrate consists of at least 99.5% $SiO_2$ by weight.

22. The assembly of claim 21, wherein the glass of the substrate allows transmittance of ultraviolet, visible, and/or near infrared light that is greater than 90%.

23. An assembly for growing carbon nanotubes, comprising:
(A) a substrate,
 (i) wherein the substrate is formed from a glass comprising $SiO_2$;
 (ii) wherein the glass has a high softening point temperature, that being greater than 800° C.;
 (iii) wherein the substrate is arranged as a thin sheet having a thickness of less than 500 µm;
 (iv) wherein the substrate has a minimum dimension orthogonal to the thickness that is less than 100 m and greater than 1 mm;
 (v) wherein the substrate has a non-circular periphery orthogonal to the thickness thereof; and
 (vi) wherein the substrate has a surface that comprises raised and recessed features, wherein at least some of the raised features extend from the surface a distance of at least 10 angstroms further than the recessed features, wherein the raised and recessed features are formed in the $SiO_2$ material of the substrate; and
(B) a catalyst, wherein the catalyst is at least partially positioned in the recessed features of the surface of the substrate; and
(C) carbon nanotubes,
 (i) wherein the carbon nanotubes contact the catalyst; and
 (ii) wherein the carbon nanotubes are anchored to the recessed features of the substrate.

24. The assembly of claim 23, wherein the non-circular periphery is rectilinear.

25. The assembly of claim 23, wherein the non-circular periphery is rectangular.

26. The assembly of claim 23, wherein the surface comprises intersecting elongate features.

27. The assembly of claim 26, wherein the elongate features having a length at least ten times a width thereof.

28. The assembly of claim 27, wherein at least some of the elongate features have a width that is greater than 2 µm and less than 10 mm.

29. The assembly of claim 28, wherein texture of the surface is at least in part formed by the intersecting elongate features, and wherein at least some of the raised features of the surface extend outward from the surface a distance of at least 2 µm greater than at least some of the recessed features of the surface.

30. The assembly of claim 23, wherein the catalyst comprises a transition metal.

* * * * *